Jan. 14, 1930.  J. T. E. HILLHOUSE  1,743,453
ELECTROMAGNETIC DEVICE
Filed Feb. 24, 1928
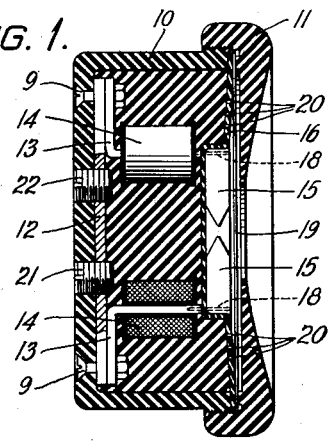
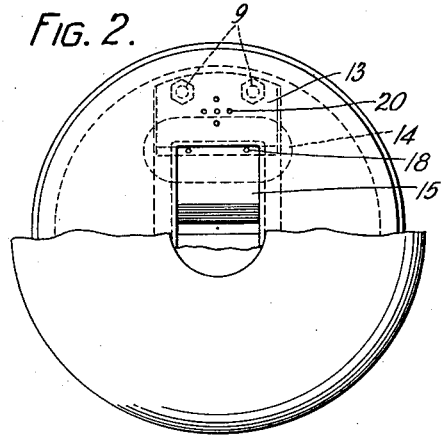
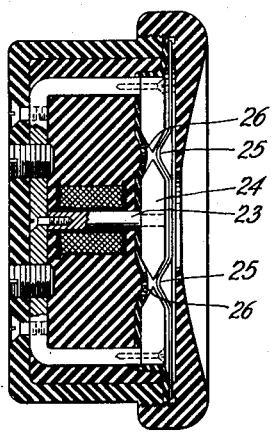
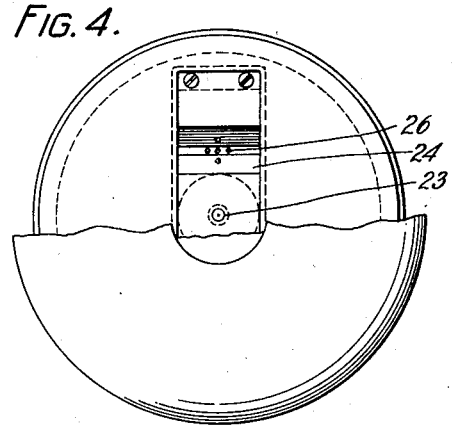
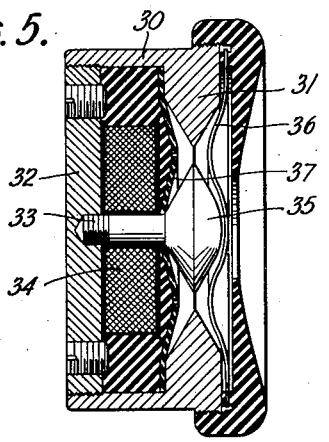
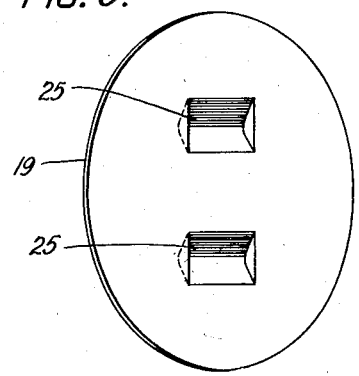
INVENTOR
JOHN T. E. HILLHOUSE
BY H. G. Bandfield
ATTORNEY Patented Jan. 14, 1930

1,743,453

UNITED STATES PATENT OFFICE

JOHN T. E. HILLHOUSE, OF FLUSHING, NEW YORK, ASSIGNOR TO BELL TELEPHONE LABORATORIES, INCORPORATED, OF NEW YORK, N. Y., A CORPORATION OF NEW YORK

ELECTROMAGNETIC DEVICE

Application filed February 24, 1928. Serial No. 256,726.

This invention relates to electromagnetic devices employing vibrating diaphragms, and more particularly to a receiver or sound radiator in which variations in the magnetic susceptibility of a gas are utilized to cause corresponding vibrations of a diaphragm.

In a specific form of this invention the tapered poles of an electromagnet are enclosed in a gas filled chamber, one wall of which comprises a diaphragm of the device. The gas enclosed in the chamber is one in which the molecules are susceptible to any change in the strength of a magnetic field passing between the two tapered pole pieces and may be either a diamagnetic or a paramagnetic gas. If a paramagnetic gas is used and the magnet excited by an outside source of current the diaphragm will move inward due to the molecules of gas being drawn away from the diaphragm under the influence of the lines of force in the magnetic field which are concentrated between the tapered pole pieces. When the strength of the magnet is decreased, the molecules will tend to return to normal and the diaphragm will tend to return to its original position. If a diamagnetic gas is used the reaction of the gas molecules, to any change in the strength of the magnetic field, will be the reverse of that when a paramagnetic gas is used, thus when the magnet is excited the diaphragm will move outward due to the molecules of gas being forced against the diaphragm under the influence of the lines of force in the magnetic field concentrated between the pole pieces. Any variation in the strength of the magnetic field will thus cause the diaphragm to vibrate accordingly.

In another embodiment of this invention a more uniform pull on the diaphragm may be obtained by employing a series of tapered poles rather than a single pair.

In still another embodiment of this invention the diaphragm may be shaped to correspond to the contour of the upper side of the tapered poles. In this arrangement the space through which the lines of force are free to act is limited and a more uniform and rapid response of the diaphragm, to any change in the strength of the magnetic field, is obtained.

The invention may be more clearly understood by reference to the accompanying drawing in which:

Fig. 1 is a sectional view of a watch-case type of receiver embodying this invention;

Fig. 2 is a plan view thereof with a portion of the cap member and the diaphragm removed;

Figs. 3 and 5 are sectional views of other embodiments of this invention;

Fig. 4 is a plan view of Fig. 3 with a portion of the cap and diaphragm removed; and Fig. 6 is a view of the diaphragm of the device disclosed in Fig. 3 showing the depressions therein.

Referring to Fig. 1 there is shown a receiver casing 10 of the customary watch-case type, preferably made of hard rubber and within which there is located a permanent magnet 12 to the opposite poles of which are secured pole pieces 13—13 carrying windings 14—14 and having their pole faces 15—15 tapered at the ends and slightly separated by an air gap. The pole pieces comprise L-shaped portions 13—13 secured to the permanent magnet 12 by screws 9—9 which also serve to secure the permanent magnet to the base of the casing and pole faces 15—15 which are attached to the L-shaped portions by pins 18—18. A gas, for example, oxygen or ammonia, the molecules of which are responsive to changes in the strength of a magnetic field is sealed within the casing in the gap separating the tapered pole faces by means of a non-magnetic disc 16 and a diaphragm 19, both being securely clamped at their peripheries by cap member 11. Disc 16 which, for example, may be made from brass or other non-magnetic material is so shaped that it encloses the pole faces 15—15 on the bottom and on both sides. The gas may be introduced into the chamber in any suitable manner, for example as shown, a small perforated area 20 is provided in disc 16 at each end of the closure, thereby permitting the gas when forced through opening 21 in the rear of the chamber to entirely fill the structure. When the receiver casing is entirely filled with gas, an insulating compound, the viscosity of which prevents it from passing through the perforations 20—20 in disc 16, is poured through opening 21 in the rear wall of the chamber until the space within the casing between disc 16 and the rear wall of the casing is entirely filled. As the insulating compound is poured through opening 21, the gas with the exception of that enclosed within the enclosure between the tapered pole pieces, is forced out through opening 22. When the casing is filled with the insulating compound, the compound is allowed to harden and the casing then closed by the insertion of screw plugs into the openings 21 and 22.

When the space between the tapered poles is filled with a paramagnetic gas for example, oxygen and the electromagnet excited by passing alternating current through the windings 14—14, the greatest number of lines of force will be concentrated between the ends of the tapered pole faces 15—15 and since the molecules of the enclosed gas are responsive to any change in the strength of the magnetic field, the greatest concentration of the molecules of gas will be at this point. Under these conditions the diaphragm 19 tends to move inward due to the molecules of the enclosed gas being drawn away from the diaphragm and to the outside air pressure. When the strength of the magnet is decreased the molecules tend to return to normal, thereby allowing the diaphragm to return to its original position.

If a diamagnetic gas, for example, ammonia, is used the reaction of the gas molecules to any change in the strength of the magnetic field will be the reverse of that when a paramagnetic gas is used.

Referring to Fig. 3 there is shown another embodiment of this invention differing from that shown in Fig. 1 in that there is an increase in the number of poles employed and that the space occupied by the enclosed gas is limited. As shown by Figs. 3 and 4 of the drawing this is accomplished by making the stud member 23, which has an elongated head 24 and the ends of which are tapered, a part of the magnetic circuit and by forming depressions 25 in the diaphragm 19 (Fig. 6) and depressions 26, 26 in the disc 16 to conform with the taper of the pole faces. This type of construction permits a more uniform and rapid response of the diaphragm to any change in the strength of the magnetic field.

Fig. 5 shows another embodiment of this invention. In this embodiment the magnetic circuit consists of a circular member 30 having an internal projection 31 at one rim which is tapered to form one pole of the electromagnet; a disc member 32 having screw threads adapted to engage similar threads on the inside of the other rim of member 30, and a stud member 33 carrying winding 34. The stud member 33 which is adapted to be in screw threaded engagement with disc member 32 has a circular head 35 which is tapered to form the other pole of the electromagnet. The ends of the tapered poles are in alignment and are slightly separated. The gas is sealed within the casing in the gap separating the tapered pole pieces by means of diaphragm 36 and the nonmagnetic disc 37, both of which are shaped to conform with the taper of the pole faces. The gas may be inserted into the enclosure in a manner similar to that disclosed heretofore.

What is claimed is:

1. In an electromagnetic device, a casing having a vibratory member as one wall, means for producing a varying magnetic field in said casing and means comprising a gaseous medium sealed in said casing and responsive to a change in said magnetic field for causing said vibratory member to respond to changes therein.

2. In an electromagnetic device, a casing having a vibratory member as one wall, means for producing a varying magnetic field in said casing and means comprising a paramagnetic gas sealed in said casing and responsive to a change in said magnetic field for causing said vibratory member to respond to changes therein.

3. In an electromagnetic device, a casing having a vibratory member as one wall, means comprising an electromagnet for producing a varying magnetic field in said chamber, and a gas sealed in said casing and responsive to changes in said magnetic field for causing said vibratory member to respond to changes therein.

4. In an electromagnetic device, a casing having a vibratory member as one wall, means comprising an electromagnet for producing a varying magnetic field in said casing, a plurality of tapered poles on said electromagnet for producing a maximum variation of said field for a given change in the strength of said electromagnet and means comprising a gas sealed in said casing and responsive to changes in said magnetic field for causing said vibratory member to respond to changes in said magnetic field.

5. In an electromagnetic device, a casing having a vibratory member as one wall, means comprising an electromagnet for producing a varying magnetic field in said casing, a plurality of tapered poles, the ends of which are slightly separated from each other, on said electromagnet for producing a maximum variation in said field for a given change in the strength of said electromagnet, and means comprising a gas responsive to changes in said magnetic field and sealed in said chamber for causing said vibratory member to respond to changes in said magnetic field.

6. In an electromagnetic device, a casing having a vibratory member as one wall, means comprising an electromagnet for producing a varying magnetic field in said casing, a plurality of tapered poles on said electromagnet for producing a maximum variation of said field for a given change in the strength of said electromagnet, a gas responsive to changes in said magnetic field sealed in said chamber for causing said vibratory member to respond to changes in said magnetic field, and means including said vibratory member for confining said gas to the space immediately surrounding said tapered pole pieces.

In witness whereof, I hereunto subscribe my name this 21st day of February, 1928.

JOHN T. E. HILLHOUSE.